US004001693B2

United States Statutory Invention Registration [19]

[11] Reg. Number: H1693

[45] Published: Nov. 4, 1997

Thornton et al.

[54] METHOD FOR REMOVING NON-GEOLOGIC AMPLITUDE VARIATIONS FROM SEISMIC DATA

[75] Inventors: Michael P. Thornton; Yiu-Wa A. Lau, both of Houston, Tex.

[73] Assignee: Exxon Production Research Company, Houston, Tex.

[21] Appl. No.: 746,616

[22] Filed: Nov. 12, 1996

Related U.S. Application Data

[60] Provisional application No. 60/006,789, Nov. 15, 1995.

[51] Int. Cl. [6] ..... G01V 1/48

[52] U.S. Cl. ..... 364/421

*Primary Examiner*—Bernarr E. Gregory
*Attorney, Agent, or Firm*—Keith A. Bell

[57] ABSTRACT

A method for removing non-geologic amplitude variations from seismic data. The method is based on the premise that lateral amplitude variations with spatial wavelengths shorter than the width of the Fresnel zone, a known wave propagation effect, for the target cannot be caused by changes in the reflectivity of the target and must, therefore, be due to non-geologic causes. The method permits these non-geologic amplitude effects to be identified and removed from the seismic data. The method may be implemented either manually or automatically by a computer.

24 Claims, 10 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR REMOVING NON-GEOLOGIC AMPLITUDE VARIATIONS FROM SEISMIC DATA

This application claims the benefit of U.S. Provisional Application No. 60/006,789, filed Nov. 15, 1995.

FIELD OF THE INVENTION

This invention relates generally to the field of seismic prospecting and, more particularly, to seismic data processing operations. Specifically, the invention is a method for removing non-geologic amplitude variations from seismic data.

BACKGROUND OF THE INVENTION

In the oil and gas industry, seismic prospecting techniques are commonly used to aid in the search for and evaluation of subterranean hydrocarbon deposits. In seismic prospecting, a seismic energy source is used to generate a seismic signal which propagates into the earth and is at least partially reflected by subsurface seismic reflectors (i.e., interfaces between underground formations having different elastic properties). The reflections are recorded by seismic detectors located at or near the surface of the earth, in an overlying body of water, or at known depths in boreholes, and the resulting seismic data may be processed to yield information relating to the geologic structure and properties of the subsurface formations.

The goal of all seismic data processing is to extract from the data as much information as possible regarding the subsurface formations. Early seismic data processing efforts were directed primarily toward the development of methods for determining the geologic structure of the subsurface formations, and methods have been developed which permit geologic structure to be determined with a great deal of accuracy. More recently, other data processing techniques have been developed for use in deriving the geologic properties of the subsurface formations. These techniques use the amplitudes of the seismic reflections to infer the geologic properties. Examples of these techniques include direct hydrocarbon indication or "DHI" (See, e.g., Backus, M. M. and Chen, R. L., 1975, "Flat spot exploration," *Geophysical Prospecting*, vol. 23, pp. 533–577), amplitude variation with offset or "AVO" analysis (See, e.g., Yu, G., 1985, "Offset-amplitude variation and controlled amplitude processing," *Geophysics*, vol. 50, pp. 2697–2708), and stratigraphic interpretation (See, e.g., Sangree, J. B. and Widimar, J. M., 1979, "Interpretation of depositional facies from seismic data," *Geophysics*, vol. 44, pp. 131–160).

In order for these techniques for inferring subsurface geologic properties to be successful, the amplitudes of the seismic data must be processed so that they are free from non-geologic amplitude effects, yet accurately represent the true amplitudes resulting from reflection of the input signal by the geologic target. As used herein, "non-geologic amplitude effects" include all the mechanisms that cause the measured seismic amplitude to deviate from the amplitude caused by the reflection coefficient of the geologic target. These non-geologic amplitude effects can be related to acquisition of the data or due to near surface or overburden effects. Examples of non-geologic amplitude effects that can be particularly troublesome are source and receiver variation, coherent noises, electrical noise or spikes, and overburden or transmission effects. If uncorrected these effects will dominate the seismic image and obscure the true geologic picture. Thus, a need exists for a method of removing these non-geologic amplitude effects without adversely affecting the quality of the resulting data.

A typical three dimensional (3D) seismic survey may include hundreds or even thousands of source locations and receiver locations, which can generate an immense amount of data to process. Therefore, it is imperative that any method for removing non-geologic amplitude effects be capable of doing so in an automated fashion.

A variety of methods have been tried to correct for non-geologic amplitude effects. The oldest method is hand editing, i.e., carefully examining the data and deleting traces or portions of traces that one suspects of being contaminated by non-geologic effects. This method can be very effective for removing noises such as spikes, bad channels, and other acquisition noises. However, this method does not address source and receiver variation or overburden effects. Further, to be effective this method requires a diligent effort on the part of the analyst processing the data, and some noise problems are not always obvious to the naked eye. Because of the high amount of labor involved in this method, it is not practical for 3D surveys.

The simplest automatic method for correcting for non-geologic amplitude effects is to use some kind of automatic gain control (AGC). There are many variations on this method, but all involve measuring the amplitude of a trace over some window and computing a scalar that will scale the measured amplitude to a given constant. In a conventional AGC, the scalars are recalculated for each sample in the trace. Some gain routines compute a scalar for a set of windows along a trace and prorate the scalars between windows. Trace balances compute a scalar from a single window in a trace, then apply the scalar to the entire trace. These methods are good at suppressing source and receiver variation, noises, and overburden effects, and are fairly automatic. Unfortunately, they also tend to distort the geologic amplitudes of the data, often quite severely. This distortion is caused by using the same constant when computing the scalar for each trace window. This is essentially an assumption that the geologic amplitudes are the same for every window in every trace. In many cases, this assumption is incorrect.

A wide variety of methods have been developed to correct for source and receiver variation (See, e.g., Taner, M. T. and Kohler, f., 1981, "Surface consistent corrections," *Geophysics*, vol. 46, pp. 17–22). These methods usually exploit the fact that source and receiver variations are surface consistent. That is, they can be assigned to a particular location on the earth's surface. These methods only correct for source and receiver variations.

Another set of methods have been developed to correct for coherent noises, spikes, bad channels, and other acquisition noises. These methods decompose the measured amplitude variation into surface consistent and non-surface consistent components. Scalars can then be applied that remove the non-surface consistent portion.

Another class of methods try to identify and suppress noises based on frequency content and/or other statistical measures of the trace. These methods work to suppress noises to varying degrees, however, they do not correct for overburden effects.

The only known method that attempts to correct for overburden effects is Western Geophysical's TRAC procedure. This procedure is a reflection tomography method that corrects seismic data for gross transmission amplitude losses for a specific overburden horizon. TRAC, however, is not intended to correct for other types of non-geologic amplitude effects.

Currently, there is no known method to simultaneously correct all three types of non-geologic amplitude variation discussed above, source and receiver variation, noises, and overburden effects. Thus, there is clearly a need for a method which can do so and which can function in an automated fashion to process data from a 3D seismic survey.

SUMMARY OF THE INVENTION

The present invention corrects for non-geologic amplitude variations in seismic data by estimating the geologic portion of the amplitude field, then scaling the data to match the geologic amplitude field. In one embodiment the present inventive method for removing non-geologic amplitude variations from a set of seismic data traces comprises the steps of (a) dividing the set of seismic data traces into one or more time windows containing segments of the seismic data traces; (b) determining an amplitude value for each of the trace segments; (c) selecting a seismic data trace from the set of seismic data traces and for each time window along the selected seismic data trace (i) determining the width of the Fresnel zone for the time window, (ii) determining a Fresnel zone average amplitude value for all trace segments within the Fresnel zone, and (iii) determining a scalar that will scale the amplitude value for the segment of the selected seismic data trace within the time window to match the Fresnel zone average amplitude value; (d) interpolating the scalars between adjacent time windows to determine a prorated gain value for each data sample on the selected seismic data trace; (e) multiplying each data sample on the selected seismic data trace by the prorated gain value for that data sample to create a scaled seismic data trace; and (f) repeating steps (c) through (e) for each of the seismic data traces.

The inventive method may be used with either 2D or 3D data, and the data may be either stacked or unstacked. The method has both a "normal" mode for routine processing activities and an "extreme" mode for suppressing strong offset consistent noises.

BRIEF DESCRIPTION OF THE DRAWINGS

The present invention and its advantages will be better understood by referring to the following detailed description and the attached drawings in which:

FIG. 3 shows the stacked data before application of the invention, while FIG. 4 shows the same stacked data after application of the invention. FIGS. 5 and 6 show a CDP gather from the same line before and after, respectively, application of the invention.

FIG. 7 shows the stacked data after divergence correction and application of the "normal" mode of the invention. FIG. 8 shows the same data after two iterations of the "extreme" model. FIGS. 9 and 10 show common midpoint (CMP) gathers before and after, respectively, application of the "extreme" mode.

Figure 1:
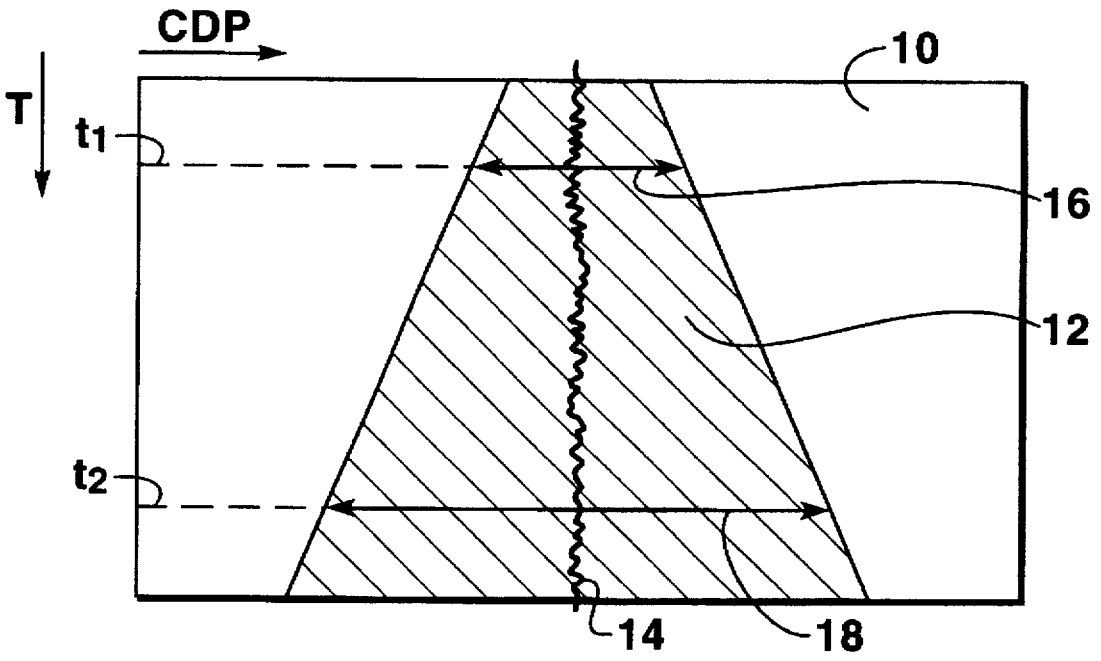
FIG. 1 illustrates the Fresnel zone concept for a 2D common depth point (CDP) seismic section.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The present invention is a new type of AGC procedure which utilizes a known wave propagation characteristic, the Fresnel zone. Basically, the Fresnel zone comprises the portion of a reflector from which reflected energy can reach a detector within one-half wavelength of the first reflected energy. It is known that, prior to migration, the Fresnel zone describes the lower limit of spatial (i.e., lateral) resolution for a target at a given depth and a received signal at a given frequency. Therefore, only lateral amplitude variations with spatial periods equal to or greater than the width of the Fresnel zone can be ascribed to geologic changes. Measured amplitude variations along a target which have a spatial wavelength shorter than the width of the Fresnel zone cannot be caused by change in the reflectivity of the target and must, therefore, be due to other effects. By removing the short period variation in the measured amplitude field, the portion of the amplitude field due to geologic changes can be estimated. Once the geologic portion of the amplitude field is known, it is a relatively simple matter to construct scalars that will scale a given trace to match the geologic amplitude field. In this manner, non-geologic amplitude effects can be removed from a seismic data set.

The invention is intended to be practiced on a digital computer programmed in accordance with the teachings set forth herein. A person of ordinary skill in the art of seismic data processing would be able to easily develop computer software for performing the present invention. Alternatively, the method may be performed manually, if desired.

Preferably, the method is used on pre-stack divergence-corrected common offset data immediately after editing. However, it can also be used with other types of seismic data gathers and can be performed at any place in the data processing stream. The method may also be used on post-stack data. One example of use with post-stack data is to smooth out edge effects that can cause "smiles" in post-stack migration. Either 2D or 3D data may be processed with the method.

The invention is a trace-by-trace process performed in two phases. The first phase, the design phase, estimates the geologic portion of the seismic amplitude field from the input data. During this phase, corrections for short period amplitude variations are calculated and applied to the seismic amplitude field to produce the geologic amplitude field. As noted above, the short period correction is based on the requirement that amplitudes prior to migration are smooth within a Fresnel zone. The second phase, the apply phase, compares the amplitude of the input trace to the geologic amplitude field, computes a gain function, and scales the trace.

One significant difference between conventional AGC and the present invention is that the value to which each window is scaled is no longer a constant; it is allowed to vary along the line (laterally) and in time (vertically). According to the invention, an amplitude value is computed for several time windows for each seismic trace in a data set. Preferably, these time windows are contiguous along the portion of the trace of interest; however, if desired, time gaps may be inserted between consecutive time windows. The geologic portion of amplitude field is taken as some kind of average amplitude value (e.g., average absolute amplitude or RMS amplitude) over all traces from the same time window within the Fresnel zone. A scalar is then computed from the ratio of the individual trace amplitude and the Fresnel zone average amplitude that will scale the trace amplitude to match the Fresnel zone average amplitude value. This process is repeated for all windows in a trace. The scalars are interpolated between window centers to create a gain function for each sample in the data set.

The method of the present invention will effectively remove a wide variety of non-geologic amplitude effects, including moderate source and receiver variation, coherent noises, electrical noise and spikes, and some types of overburden or transmission effects. This method is fairly simple to parameterize, since the key parameter, the width of the Fresnel zone, can be computed from the arrival time, the RMS velocity, and the dominant frequency of an event. As will be well known to those skilled in the art, all of these quantities are routinely measured in seismic data processing. However, it should be noted that the present method does not correct for amplitude effects that are consistent within a Fresnel zone, namely ground roll. It also does not remove bulk transmission loss; it will only produce relative corrections, those due to lateral changes in the overburden.

FIG. 1 illustrates the Fresnel zone concept in a 2D common offset seismic section 10. The width of the Fresnel zone 12 for a selected CDP trace 14 generally increases with time. For example, the width 16 at time $t_1$ is less than the width 18 at a later time $t_2$. For 3D data, the radius of the Fresnel zone r can be calculated from the following formula:

$$r=\frac{v}{2}\sqrt{\frac{t}{f}}$$

where v is the RMS seismic velocity at the target, t is the two-way travel time to the target, and f is the dominant frequency. For 2D data, the Fresnel zone width would be equal to two times r. Calculation of Fresnel zone radii and widths is well known to persons of ordinary skill in the art (See, e.g., Sheriff, R. E., 1980, "Nomogram for Fresnel zone calculation," *Geophysics*, vol. 45, pp. 968–972) and, accordingly, will not be further described herein.

Figure 2A:
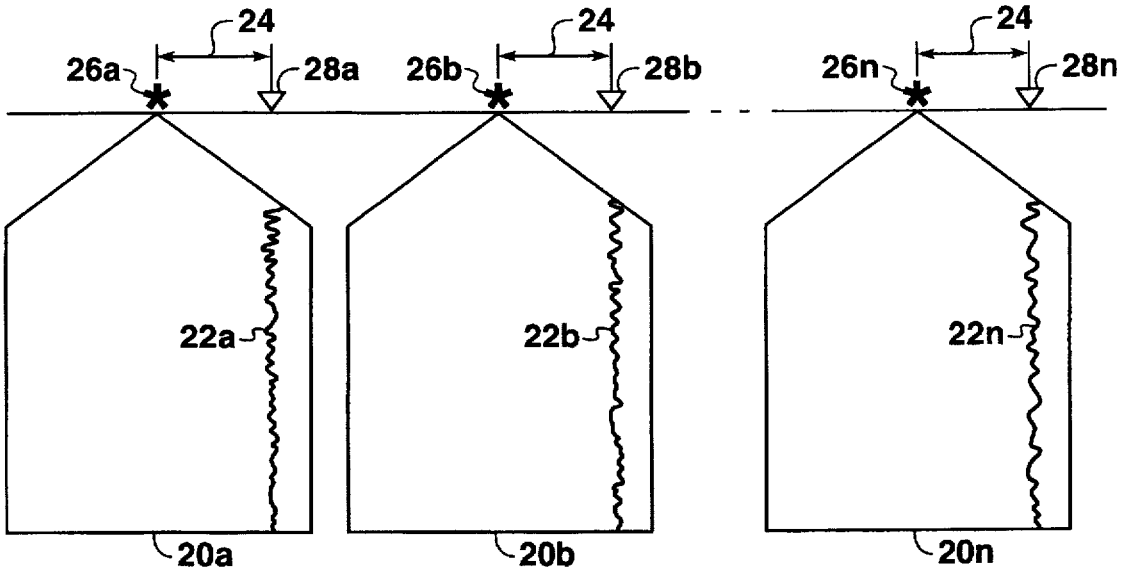
FIGS. 2A through 2C illustrate implementation of a preferred embodiment of the invention.

Implementation of a preferred embodiment of the present invention method will now be described with reference to FIGS. 2A through 2C. FIG. 2A illustrates the shot records 20*a*, 20*b*, . . . 20*n* obtained during a typical seismic survey. Each shot record shows a trace 22*a*, 22*b*, . . . 22*n* having a common offset 24. As is well known in the art, the offset of a trace is the lateral distance between the source 26*a*, 26*b*, . . . 26*n* and the detector 28*a*, 28*b*, . . . 28*n*.

Figure 2B:
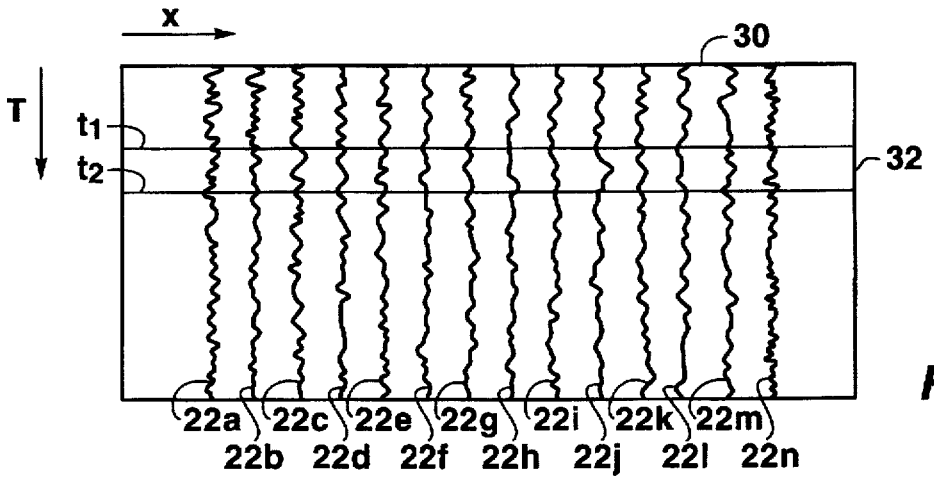

In FIG. 2B, traces 22*a*, 22*b*, . . . 22*n* have been gathered together to create a common offset section 30. A time window 32 extending from time $t_1$ to time $t_2$ is also shown. Typically, additional time windows (not shown) would be used to cover other portions of the traces. Generally, each time window is between about 200 and about 600 milliseconds in length; however, longer or shorter time windows may be used, if desired.

Figure 2C:
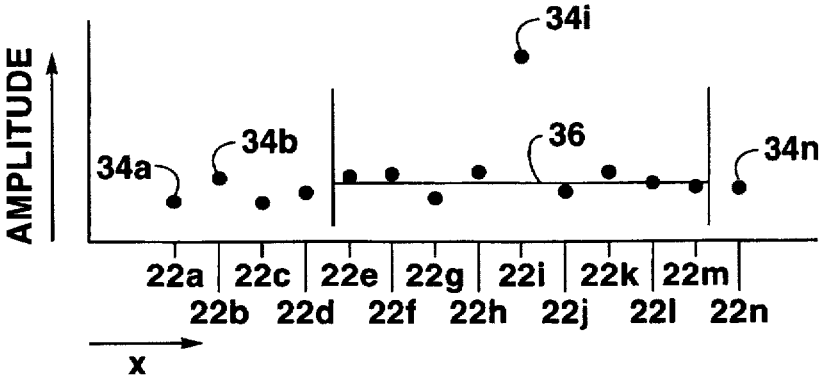

The next step, illustrated in FIG. 2C, is to compute amplitude values 34*a*, 34*b*, . . . 34*n* for the segment of each trace within window 32. Preferably, these amplitude values are average absolute amplitude values; however, other measures of trace amplitude may be used, if desired. It can be seen that the amplitude value 34*i* for trace 22*i* is an anomaly.

Next, the windowed amplitude values are smoothed laterally with a time varying filter. The width of the filter is proportional to the width of the Fresnel zone for the window in question. Preferably, the width of the Fresnel zone is calculated at the center of the window, i.e., at time $(t_1+t_2)/2$ for window 32. However, any other location within the window may be used, if desired. Preferably, the filter used is a median filter, as median filters are less sensitive to outlying values in the data. However, other types of filters may be used, if desired. For example, assuming that the width of the Fresnel zone for time window 32 includes nine traces, then for trace 22*i* the median filter would compute the median 36 of the average absolute amplitude values for traces 22*e* through 22*m*, and median 36 would be saved for later use in the apply phase of the invention.

After median amplitude values have been computed for all traces and all windows, gain values are calculated that will scale the windowed amplitude values to the median amplitude values. The gain values are assigned to the center of each window and linearly prorated from one window to the next to create a specific gain for each sample of the trace. Finally, all sample values in the trace are multiplied by the prorated gain value to create the scaled trace.

Two methods of implementing the present invention have been developed. One is for processing of seismic data with "normal" amplitude artifacts; the other is for more "extreme" amplitude problems. The invention should normally be run early in a data processing stream, so that amplitude artifacts can be removed before they affect other processes. However, the invention can be used at other locations in a data processing stream if desired.

Both methods work best when spherical divergence and source and receiver variation have been corrected. It is not necessary to correct either of these data problems, but estimation of the geologic amplitude field will be more accurate if these known effects have been removed. The invention does tend to correct for source and receiver variation, so often only a simple correction is needed for this effect.

In the "normal" mode, amplitude values are computed for each trace window in the pre-stack data set. The trace windows should be longer than the pulse length of the data, but not so long that decay in the data biases the amplitude estimate in the window, or that temporal amplitude relationships are distorted. Normally, windows 200–600 milliseconds long should be satisfactory. In order to preserve temporal and offset dependent amplitude relationships, the Fresnel zone averaging is done over a set of windows from a constant time range, and common source to receiver offset. For each position along the line, an estimate of the geologic portion of the amplitude field is computed from a rolling median and/or mean filter, the length of which is proportional to a nominal Fresnel zone for that time range. The Fresnel zone generally increases with time, therefore the width of the filters increases as two way travel time increases. Scalars are computed as described above for every window in every trace. Gain functions are computed by linearly interpolating the scalars between window centers. Displays of the estimated amplitude field before and after correction are very useful for fine tuning the parameters for this process.

The inventive method can also be used to correct amplitude anomalies in stacked data. The stacked data is treated as a zero-offset section and processed as described above. This is very useful for suppressing noise artifacts in post-stack migration.

The "extreme" mode of the invention is used to help suppress strong offset consistent noise, such as ground roll. This mode is usually run in addition to and after the "normal" mode of operation. It is an iterative method, and suppression of the offset consistent noise is done at the expense of the offset dependent amplitude relationships. In the extreme mode, a preliminary stacked data set is used to compute the Fresnel zone averages, for each window and at every CMP location. NMO corrected CMP gathers are then scaled to match these values as if they were also zero-offset traces. The scaled data is then stacked, and this new stack is used to create a new set of Fresnel zone averages, and the process is repeated until no new improvements are made in the image. Normally, two to three iterations are sufficient.

EXAMPLES

Figure 3:
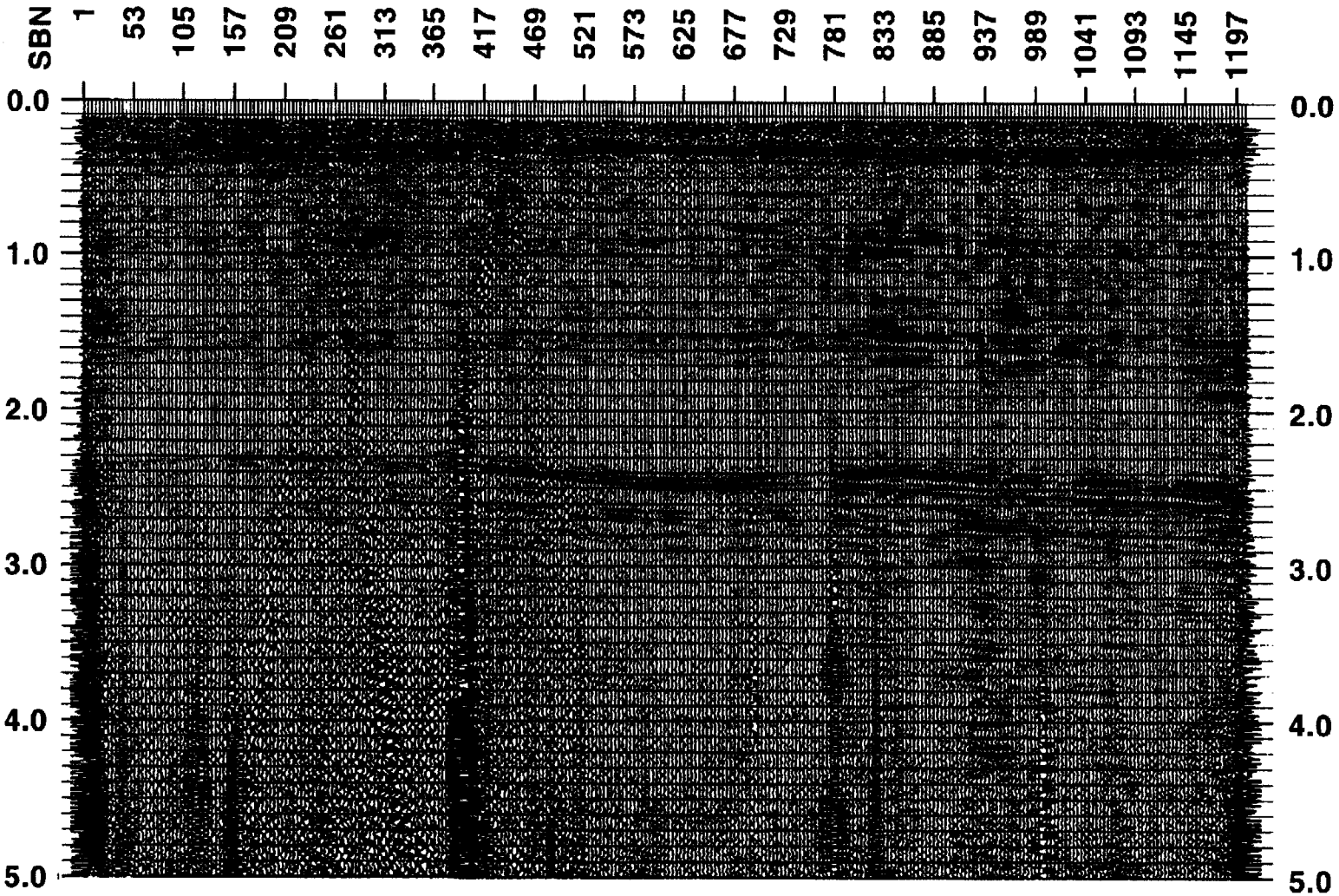
FIGS. 3–6 show an example of application of the "normal" mode of the present invention to land seismic data.
Figure 4:
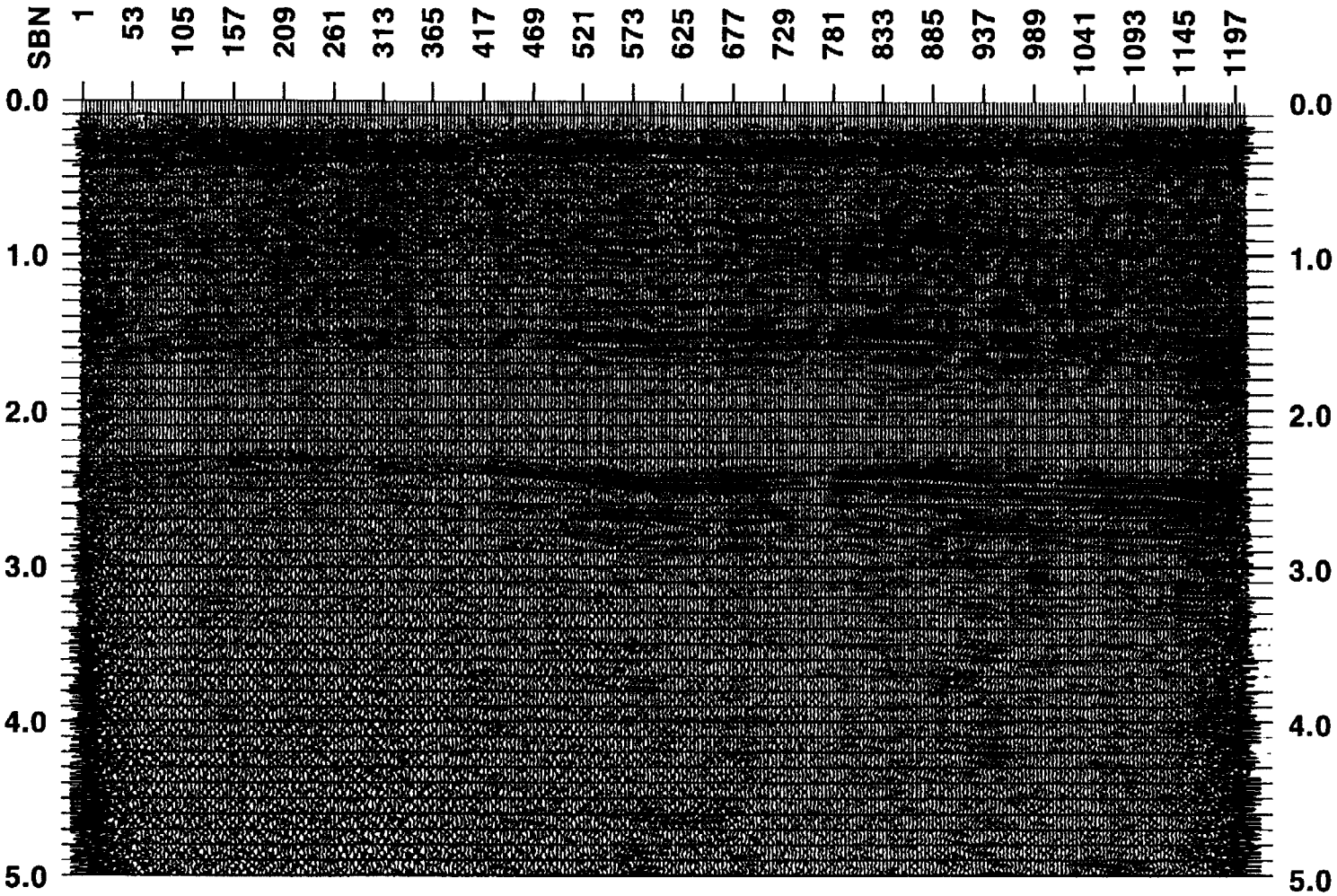
Figure 5:
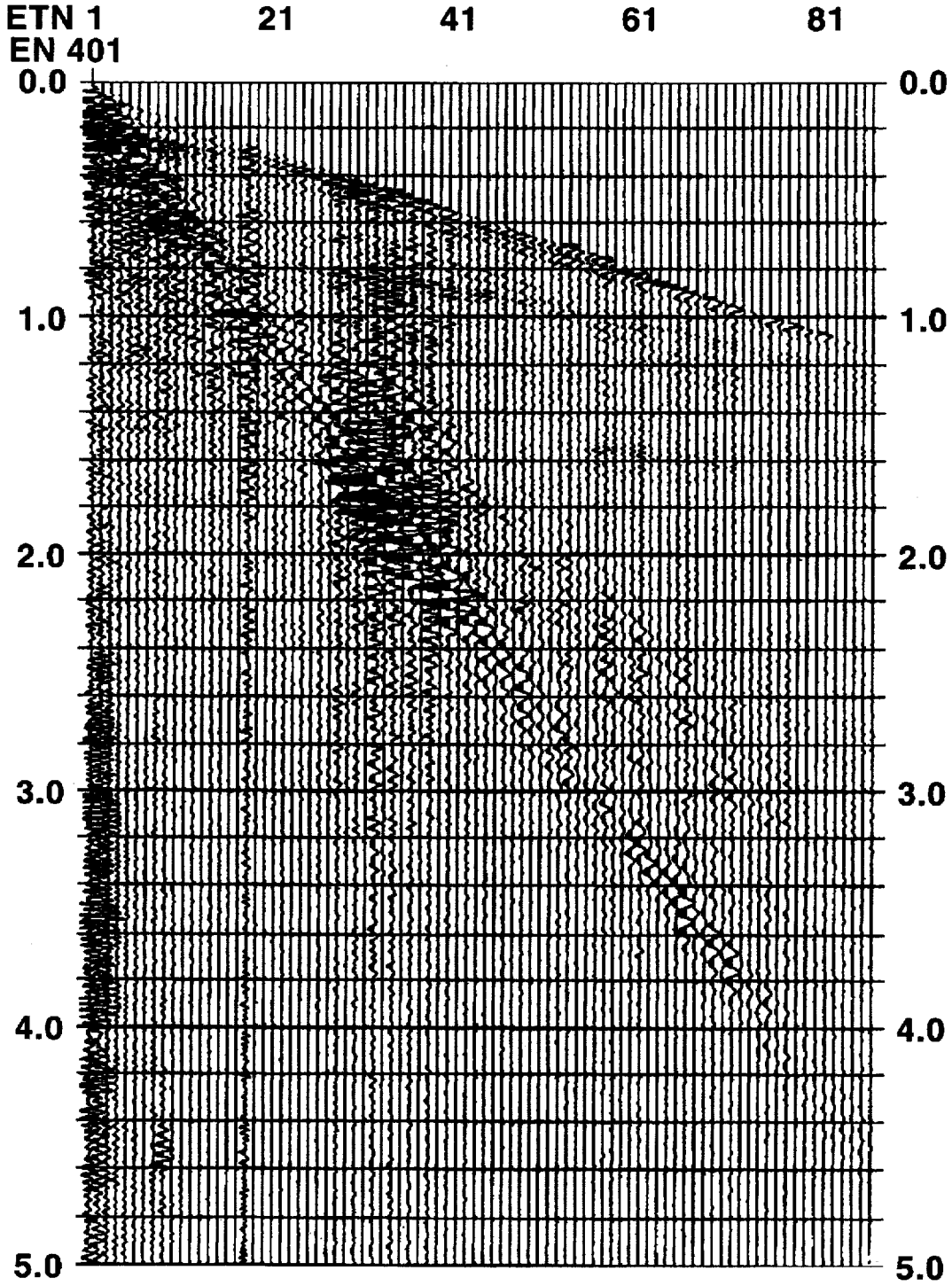
Figure 6:
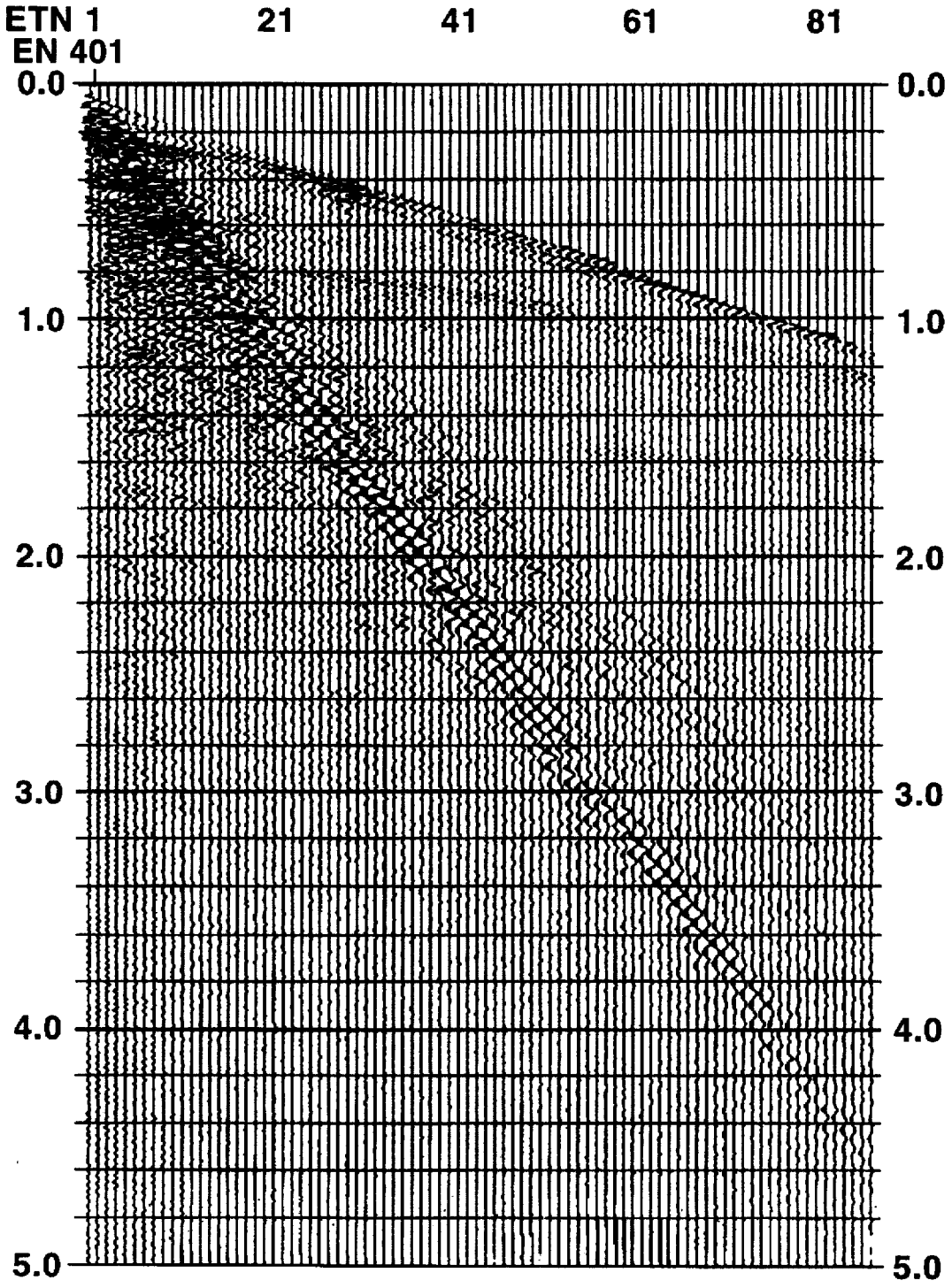

FIGS. 3–6 show an example of the application of the present invention to land seismic data in the "normal" mode. The filter width was allowed to vary from 101 traces at 0 seconds to 201 traces at 5 seconds. FIG. 3 shows the stack of the data before application of the invention. Note the high amplitude noise traces throughout the section. Compare this with the stack in FIG. 4; note how these traces have been suppressed without distorting the amplitude variation in the horizontal reflections. FIG. 5 shows a CDP gather from the same line before application of the present invention. FIG. 6 shows that same gather after application. Note the removal of the amplitude streaks and suppression of the high frequency noise trace.

Figure 7:
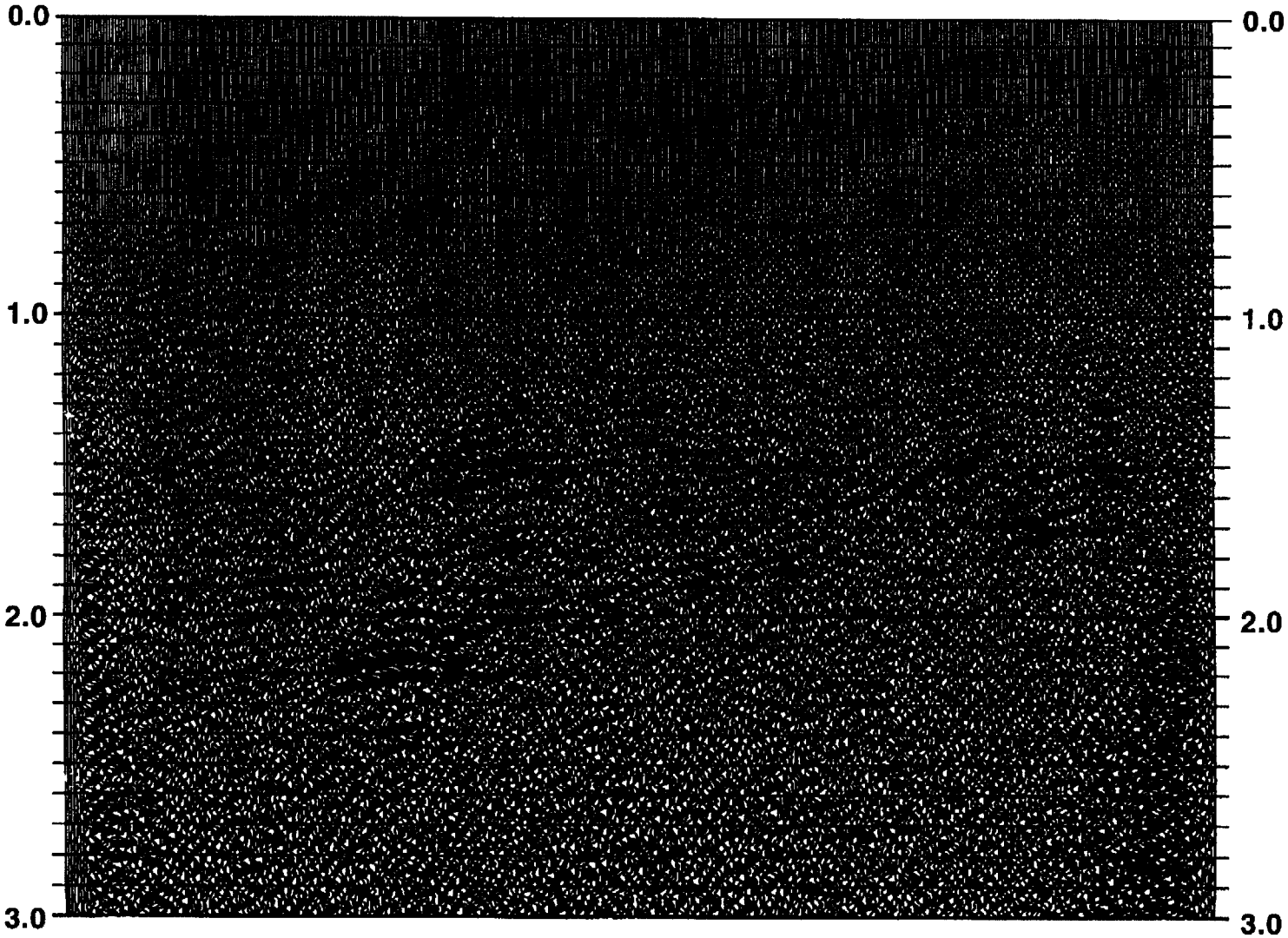
FIGS. 7–10 show an example of application of the "extreme" mode of the present invention to land seismic data with severe shot generated noise problems.
Figure 8:
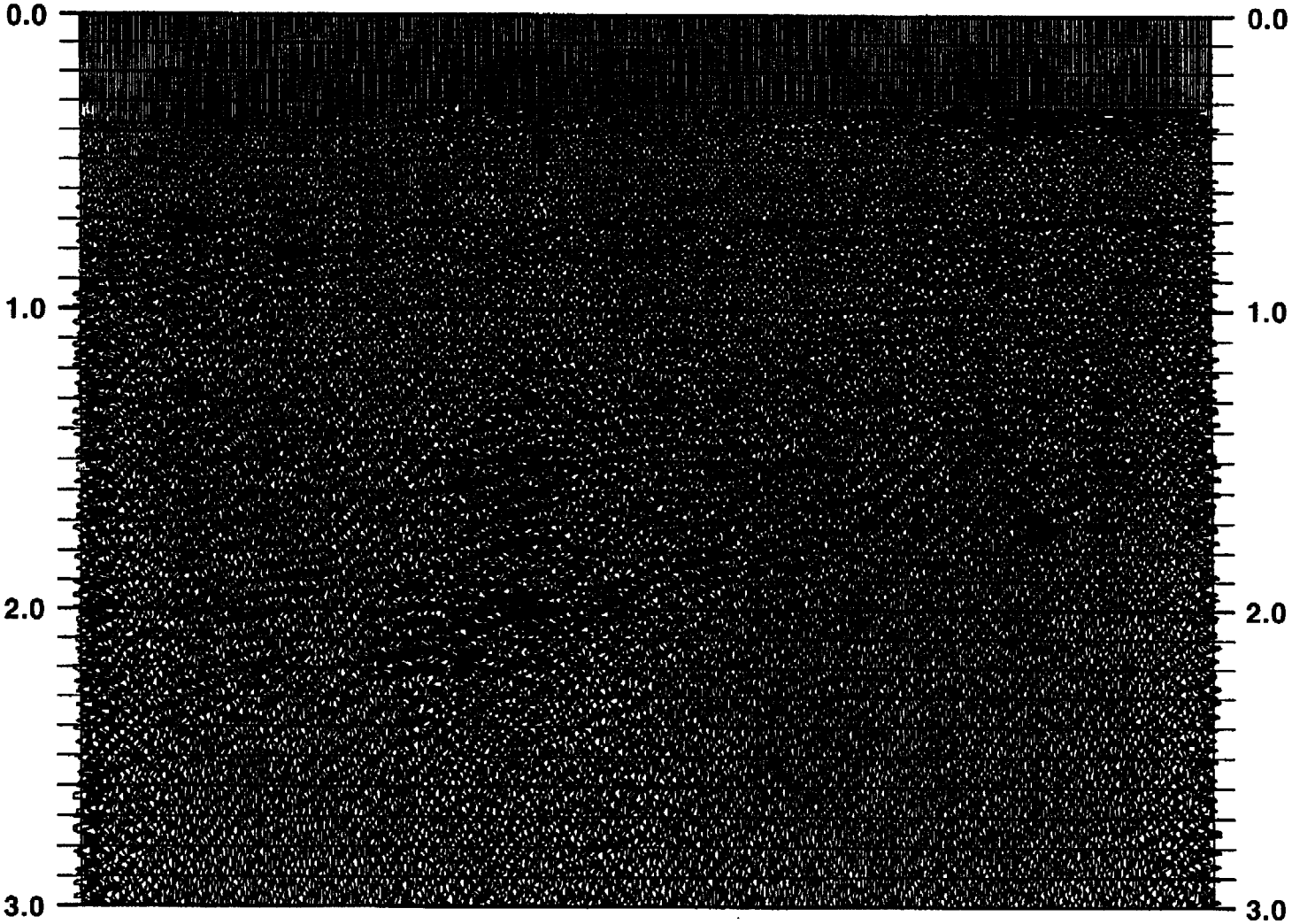
Figure 9:
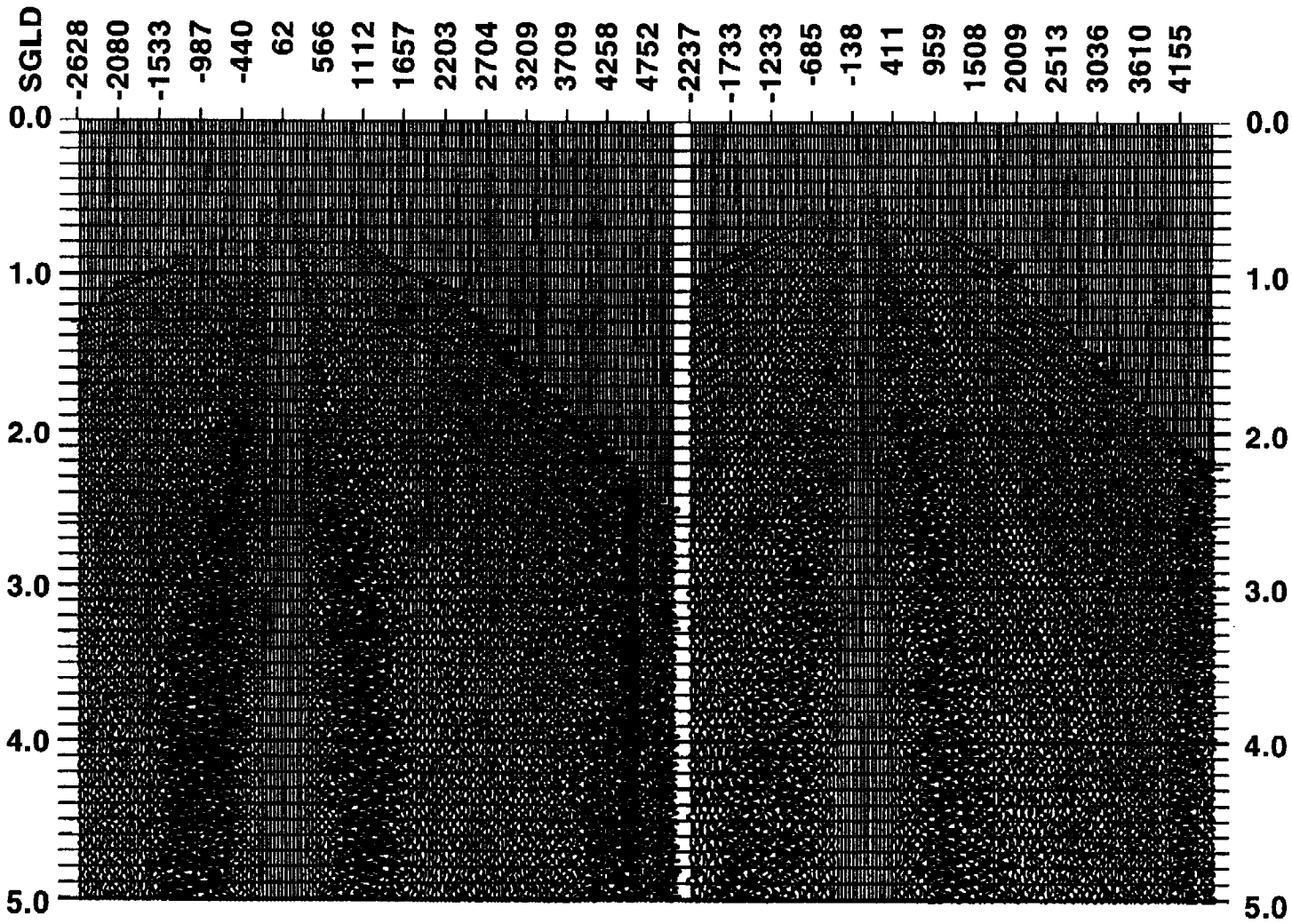
Figure 10:
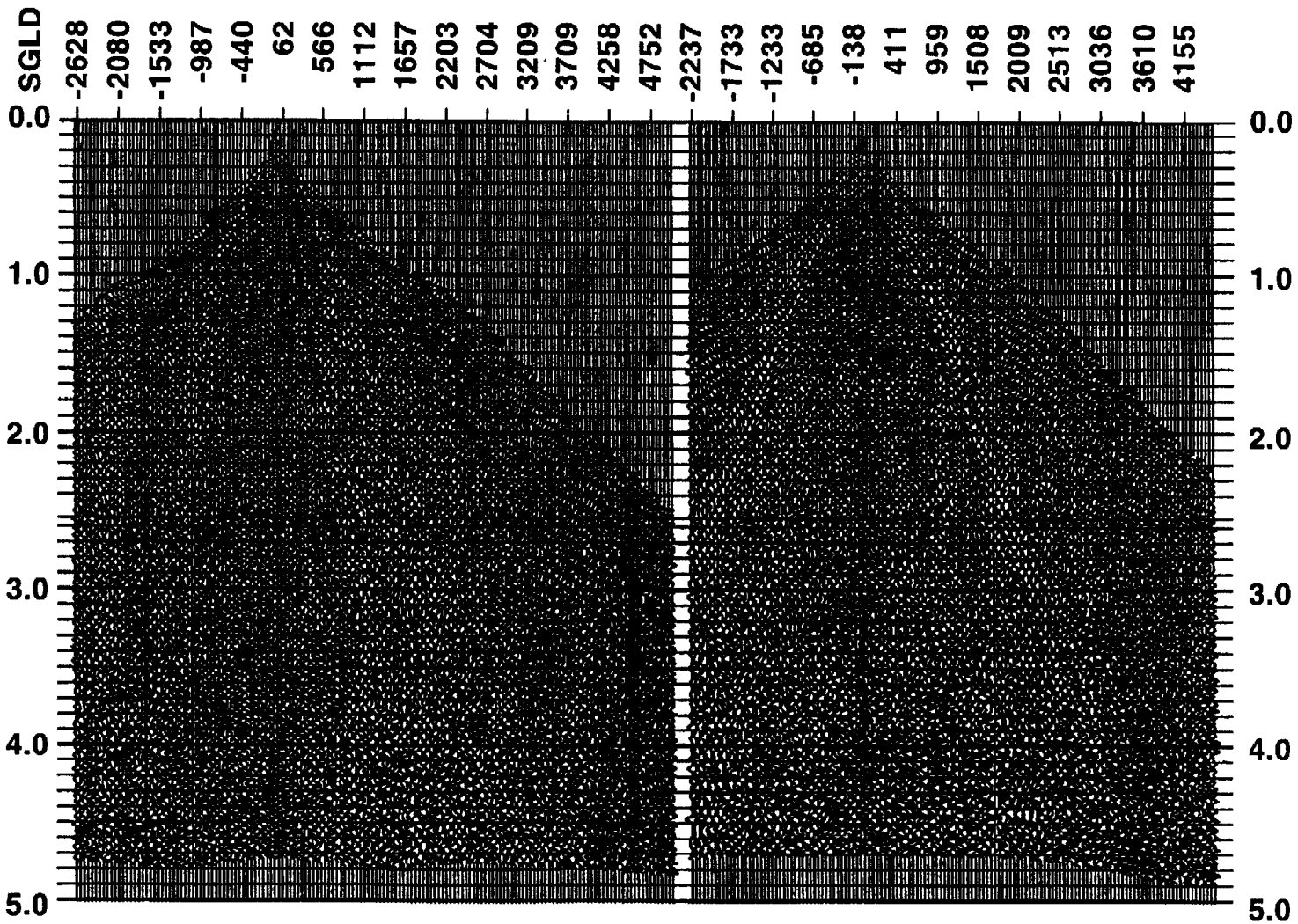

FIGS. 7–10 show the application of the "extreme" mode of the invention to a land data set with severe shot generated noise problems. FIG. 7 shows the stacked section after divergence correction and application of the "normal" mode of this invention. FIG. 8 shows the stacked data after two iterations of this technique. Note the improvement of the signal to noise ratio and the preservation of the lateral amplitude changes; the strong amplitudes in the center of the line are preserved. FIGS. 9 and 10 show CMP gathers before and after, respectively, application of the invention. In FIG. 9, the strong noise train can be seen near the center of each gather; this noise tends to dominate the stacked image. In FIG. 10, the high amplitude shot noise has been reduced to the same level as the other offsets. Now when stacked, the shot noise will not overwhelm the signal. However, the offset dependent amplitude relationships in the signal have been distorted somewhat.

It should be understood that the invention is not to be unduly limited to the foregoing which has been set forth for illustrative purposes. Various modifications and alternatives will be apparent to those skilled in the art without departing from the true scope of the invention, as defined in the following claims.

We claim:

1. A method for removing non-geologic amplitude variations from a set of seismic data traces, said method comprising the steps of:

(a) dividing said set of seismic data traces into one or more time windows containing segments of said seismic data traces;

(b) determining an amplitude value for each of said trace segments;

(c) selecting a seismic data trace from said set of seismic data traces and for each time window along said selected seismic data trace (i) determining the width of the Fresnel zone for said time window, (ii) determining a Fresnel zone average amplitude value for all trace segments within said Fresnel zone, and (iii) determining a scalar that will scale the amplitude value for the segment of said selected seismic data trace within said time window to match said Fresnel zone average amplitude value;

(d) interpolating said scalars between adjacent time windows to determine a prorated gain value for each data sample on said selected seismic data trace;

(e) multiplying each data sample on said selected seismic data trace by said prorated gain value for said data sample to create a scaled seismic data trace; and (f) repeating steps (c) through (e) for each of said seismic data traces.

2. The method of claim 1, wherein said seismic data traces are pre-stack divergence-corrected common offset seismic data traces.

3. The method of claim 1, wherein said seismic data traces are post-stack seismic data traces.

4. The method of claim 1, wherein said time windows are between about 200 milliseconds and about 600 milliseconds in length.

5. The method of claim 1, wherein said method is implemented on a digital computer.

6. The method of claim 1, wherein said amplitude value for each of said trace segments is the average absolute amplitude value for said trace segment.

7. The method of claim 1, wherein said amplitude value for each of said trace segments is the root-mean-square amplitude value for said trace segment.

8. The method of claim 1, wherein said Fresnel zone average amplitude value is the median of said amplitude values for all trace segments within said Fresnel zone.

9. The method of claim 1, wherein said Fresnel zone average amplitude value is the mean of said amplitude values for all trace segments within said Fresnel zone.

10. A method for suppressing offset consistent noises in a set of unstacked seismic data traces, said method comprising the steps of:

(a) obtaining a preliminary common midpoint (CMP) stack of said seismic data traces;

(b) dividing said CMP stack into one or more time windows;

(c) calculating Fresnel zone average amplitude values for each time window and a every CMP location;

(d) dividing said set of unstacked seismic data traces into CMP gathers;

(e) scaling each of said CMP gathers to match said Fresnel zone average amplitude values for said CMP location;

(f) stacking said scaled CMP gathers to create a new CMP stack; and (g) using said new CMP stack to repeat steps (b) through (f) until no new improvements are made in the stacked section.

11. The method of claim 10, wherein said time windows are between about 200 milliseconds and about 600 milliseconds in length.

12. The method of claim 10, wherein said method is implemented on a digital computer.

13. A method for removing non-geologic amplitude variations from a set of seismic data traces, said method comprising the steps of:

(a) dividing said set of seismic data traces into one or more time windows containing segments of said seismic data traces;

(b) calculating Freznel zone average amplitude values for each time window and at every data trace location; and (c) scaling each of said seismic data traces to match said Fresnel zone average amplitude values for said trace.

14. The method of claim 13, wherein said seismic data traces are pre-stack, divergence-corrected common offset data traces.

15. The method of claim 13, wherein said seismic data traces are post-stack seismic data traces.

16. The method of claim 13, wherein said time windows are between about 200 milliseconds and about 600 milliseconds in length.

17. The method of claim 13, wherein each Fresnel zone average amplitude value is the median of the average absolute amplitude for each trace segment within said Fresnel zone.

18. The method of claim 13, wherein each Fresnel zone average amplitude value is the main of the average absolute amplitude for each trace segment within said Fresnel zone.

19. The method of claim 13, wherein said method is implemented on a digital computer.

20. A method for removing non-geologic amplitude variations from a set of seismic data traces, said method comprising the steps of:

(a) dividing said set of seismic data traces into one or more time windows and determining the width of the Fresnel zone for each of said time windows;

(b) estimating the geologic portion of the seismic amplitude field of said seismic data traces by removing lateral amplitude variations which have spatial wavelengths shorter than the width of the Fresnel zone for the relevant time window; and (c) scaling said seismic data traces to match said geologic portion of the seismic amplitude field.

21. The method of claim 20, wherein said seismic data traces are pre-stack, divergence-corrected common offset data traces.

22. The method of claim 20, wherein said seismic data traces are post-stack seismic data traces.

23. The method of claim 20, wherein said time windows are between about 200 milliseconds and about 600 milliseconds in length.

24. The method of claim 20, wherein said method is implemented on a digital computer.

* * * * *